US012259116B2

(12) United States Patent
Liu

(10) Patent No.: US 12,259,116 B2
(45) Date of Patent: Mar. 25, 2025

(54) ROTATING BULB

(71) Applicant: Guangzhou Jiguang Lighting Co., Ltd, Guangzhou (CN)

(72) Inventor: Xiaoli Liu, Guangzhou (CN)

(73) Assignee: Guangzhou Jiguang Lighting Co., Ltd, Guangzhou (CN)

( * ) Notice: Subject to any disclaimer, the term of this patent is extended or adjusted under 35 U.S.C. 154(b) by 0 days.

(21) Appl. No.: 18/889,956

(22) Filed: Sep. 19, 2024

(65) Prior Publication Data

US 2025/0012433 A1 Jan. 9, 2025

(51) Int. Cl.
*F21V 23/00* (2015.01)
*F21K 9/237* (2016.01)
*F21S 10/02* (2006.01)
*F21V 17/16* (2006.01)
*F21V 23/04* (2006.01)

(52) U.S. Cl.
CPC .......... *F21V 23/006* (2013.01); *F21V 17/164* (2013.01); *F21V 23/04* (2013.01); *F21K 9/237* (2016.08); *F21S 10/026* (2013.01)

(58) Field of Classification Search
CPC .......... F21K 9/237; F21K 9/238; F21K 9/232; F21K 9/233; F21K 9/235; F21K 9/23; F21V 19/006; F21V 19/0065; F21V 19/007; F21V 19/04; F21S 10/026
See application file for complete search history.

(56) References Cited

U.S. PATENT DOCUMENTS 3,355,612 A * 11/1967 Peek, Jr. ............... F21V 19/008 315/71
5,744,913 A * 4/1998 Martich .................. H01J 61/56 250/206
9,759,421 B1 * 9/2017 Baschnagel ............. F21V 23/06
11,248,753 B1 * 2/2022 Li ........................... F21V 29/70
2005/0195600 A1 * 9/2005 Porchia .................. H05B 47/17 362/240
2009/0168425 A1 7/2009 Chuang
2011/0115414 A1 * 5/2011 Ku ............................ F21V 3/00 315/313
2011/0204777 A1 * 8/2011 Lenk ........................ H01K 1/64 315/32
2012/0020097 A1 1/2012 Tsay
2012/0032589 A1 * 2/2012 Lai ......................... H05B 45/46 315/35
2012/0081005 A1 * 4/2012 Lin ......................... F21S 10/00 315/86
2014/0126210 A1 5/2014 Yang
2014/0232290 A1 * 8/2014 Gergely ................. H05B 41/40 362/363
2015/0061497 A1 * 3/2015 Martins .................. H05B 45/10 315/291

(Continued)

*Primary Examiner* — William N Harris
*Assistant Examiner* — James M Endo
(74) *Attorney, Agent, or Firm* — Hemisphere Law, PLLC; Zhigang Ma

(57) ABSTRACT

The present disclosure discloses a rotating bulb, including: a lamp holder, a lower lamp cup cover, a control board, a control board fixing seat, an upper lamp cup cover, a lamp panel, and a lampshade. According to the present disclosure, the lower lamp cup cover and the upper lamp cup cover are rotated to drive the adjustable resistor to achieve dimming, which can adjust the brightness, the color temperature, and the color, and is easy to remove and mount.

11 Claims, 7 Drawing Sheets

(56) References Cited

U.S. PATENT DOCUMENTS

| | | | | |
|---|---|---|---|---|
| 2016/0211682 | A1* | 7/2016 | Chien | F21V 17/002 |
| 2017/0241623 | A1* | 8/2017 | Zhang | F21S 10/026 |
| 2018/0092183 | A1* | 3/2018 | Halliwell | F21V 19/006 |
| 2019/0011098 | A1* | 1/2019 | Thompson | F21S 9/02 |
| 2020/0187319 | A1* | 6/2020 | Jiang | H05B 45/20 |
| 2021/0404618 | A1* | 12/2021 | Li | F21K 9/238 |
| 2021/0404642 | A1* | 12/2021 | Li | F21K 9/237 |

* cited by examiner

ROTATING BULB

TECHNICAL FIELD

The present disclosure relates to the technical field of bulbs, and in particular, to a rotating bulb.

BACKGROUND

Nowadays, the way to dim a bulb or adjust a color temperature of the lamp bulb on the market is to achieve dimming through a remote controller or a silicon-controlled dimmer on a wall or by a graded toggle switch on a lamp body. Using the remote controller for dimming is costly, and the remote controller is easy to lose. If the silicon-controlled dimmer on the wall is used for dimming, it requires that an original household circuit has a dimmer, so that ordinary household circuits cannot meet the requirement. If the brightness or color temperature is adjusted by adding a lever on the lamp body, dimming or color temperature adjustment is achieved in different stages and different gears, which cannot achieve the effect of stepless dimming for gradual color change. Only a few gears can be selected. According to DLC certification in the United States, stepless dimming is coercive.

To this end, a rotating bulb is provided.

SUMMARY

The present disclosure aims to provide a rotating bulb, to solve the above problems.

To achieve the above objectives, the present disclosure provides the following technical solution: A rotating bulb includes a lamp holder, a lower lamp cup cover, a control board, a control board fixing seat, an upper lamp cup cover, a lamp panel, and a lampshade. The lamp holder is connected above the lower lamp cup cover; the control board is mounted on the control board fixing seat; the control board and the control board fixing seat are accommodated in a lower part of the lower lamp cup cover; the control board fixing seat is connected to the lower lamp cup cover; the control board fixing seat is rotatably connected to the upper lamp cup cover; the lower lamp cup cover is arranged above the upper lamp cup cover; the upper lamp cup cover is detachably connected to the lampshade; the lamp panel is mounted inside a lower part of the upper lamp cup cover; the upper lamp cup cover is provided with a circular arc groove; through holes are respectively provided at two ends of the circular arc groove; the upper lamp cup cover is provided with a circular arc through hole; a convex column corresponding to the circular arc groove is arranged at a bottom of the control board fixing seat; the control board fixing seat is hollow; the upper lamp cup cover is provided with a rotating shaft; the control board is provided with a power management circuit, an analog-to-digital conversion (ADC) chip, an adjustable resistor, a bulb driving circuit, and a control chip; the adjustable resistor and the control chip are connected to the ADC chip; the control chip is connected to the bulb driving circuit; a square edge-hole component is arranged on the adjustable resistor; and a rotating shaft passes through the control board fixing seat and is inserted into the edge-hole component.

Preferably, the upper lamp cup cover is uniformly provided with a plurality of buckles centered on the rotating shaft; the buckles are provided with circular-arc-shaped upper surfaces; the buckles are provided with protruding portions facing away from the rotating shaft; the control board fixing seat is provided with a hollow cylinder; and the buckles are in buckled connection with the hollow cylinder.

Preferably, the control board fixing seat is provided with a round wall facing the lower lamp cup cover; a plurality of clamping blocks are uniformly arranged on the round wall in a spacing manner; protrusions matched with and corresponding to the clamping blocks are arranged in the lower lamp cup cover; limiting notches are arranged on two sides of the clamping blocks; and limiting strips matched with and corresponding to the limiting notches are arranged in the lower lamp cup cover.

Preferably, an external thread is provided on the lampshade; an internal thread matched with and corresponding to the external thread is provided in the upper lamp cup cover; and the lampshade is in threaded connection with the upper lamp cup cover.

Preferably, a mounting sleeve is further arranged in the upper lamp cup cover; the lamp panel is mounted and connected to the mounting sleeve; and the lamp panel is arranged between the mounting sleeve and the lampshade.

Preferably, a plurality of supporting plates are uniformly arranged in the round wall in a spacing manner; a limiting plate is arranged in the round wall; the control board is located between the supporting plates and the limiting plate; a positioning strip is arranged in the round wall; and a positioning notch corresponding to the positioning strip is provided on the control board.

Preferably, the control board is provided with accommodating notches corresponding to positions and the quantity of the clamping blocks.

Preferably, three buckles are included.

Preferably, penetration holes facing away from the rotating shaft are provided below the buckles.

Preferably, scales are provided on the lower lamp cup cover; and an arrow indicator is provided on the upper lamp cup cover.

Compared with the prior art, the present disclosure has the beneficial effects below:

The present disclosure uses a lamp body rotation structure. By cooperation with a lamp body assembly, the lower lamp cup cover and the upper lamp cup cover are rotated to drive the adjustable resistor on the circuit board. The adjustable resistor is rotated to generate different resistance voltage signals. The control board can identify different voltages generated by the adjustable resistor, thereby controlling the bulb to achieve stepless dimming, which may achieve brightness adjustment, color temperature adjustment, and color adjustment. The rotating bulb is easy to remove and mount.

Figure 1:
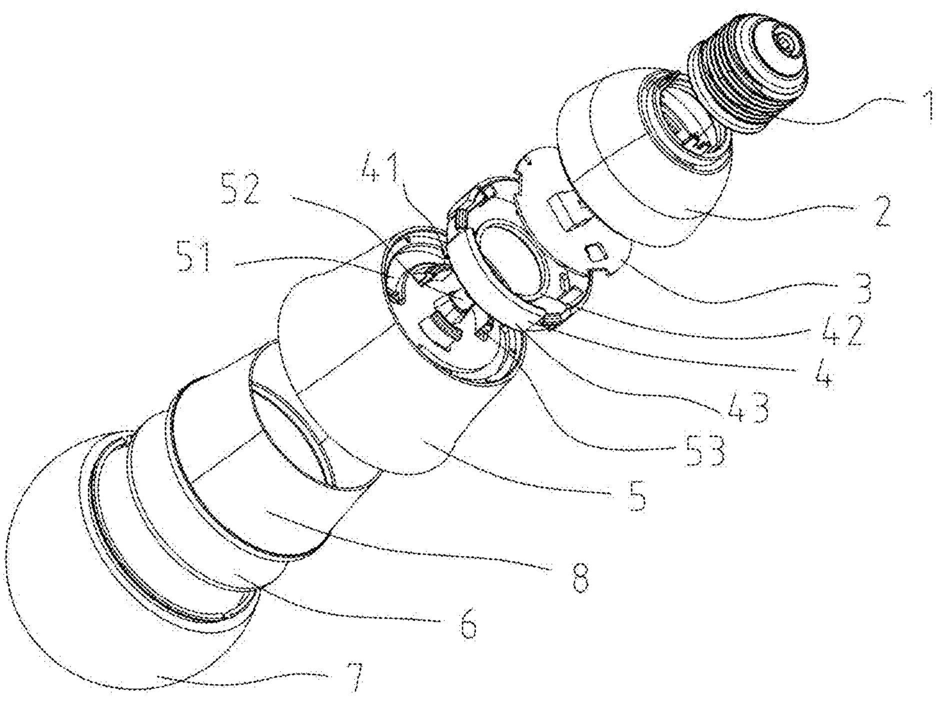
FIG. 1 is an exploded view of the present disclosure.

In the drawings: 1: lamp holder; 2: lower lamp cup cover; 3: control board; 4: control board fixing seat; 5: upper lamp cup cover; 6: lamp panel; 7: lampshade; 51: circular arc groove; 41: convex column; 52: rotating shaft; 31: edge-hole component; 53: buckle; 42: hollow cylinder; 43: round wall; 44: clamping block; 21: protrusion; 45: limiting notch; 22: limiting strip; 46: supporting plate; 47: limiting plate; 48: positioning strip; 32: positioning notch; 33: accommodating notch; 8: mounting sleeve; and 54: penetration hole.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all the embodiments. All other embodiments obtained by a person of ordinary skill in the art based on the embodiments of the present disclosure without making creative efforts shall fall within the protection scope of the present disclosure.

Referring to FIG. 1 to FIG. 7, the present disclosure provides a technical solution: A rotating bulb is provided, including a lamp holder 1, a lower lamp cup cover 2, a control board 3, a control board fixing seat 4, an upper lamp cup cover 5, a lamp panel 6, and a lampshade 7. The lamp holder 1 is detachably connected above the lower lamp cup cover 2. The control board 3 is mounted on the control board fixing seat 4; the control board 3 and the control board fixing seat 4 are accommodated in a lower part of the lower lamp cup cover 2; the control board fixing seat 4 is connected to the lower lamp cup cover 2; the control board fixing seat 4 is rotatably connected to the upper lamp cup cover 5; the lower lamp cup cover 2 is arranged above the upper lamp cup cover 5; the upper lamp cup cover 5 is detachably connected to the lampshade 7; the lamp panel 6 is mounted inside a lower part of the upper lamp cup cover 5; the upper lamp cup cover 5 is provided with a circular arc groove 51; through holes are respectively provided at two ends of the circular arc groove 51; the upper lamp cup cover 5 is provided with a circular arc through hole; a convex column 41 corresponding to the circular arc groove 51 is arranged at a bottom of the control board fixing seat 4; the control board fixing seat 4 is hollow; the upper lamp cup cover 5 is provided with a rotating shaft 52; the control board 3 is provided with a power management circuit, an ADC chip, an adjustable resistor, a bulb driving circuit, and a control chip; the adjustable resistor and the control chip are connected to the ADC chip; the control chip is connected to the bulb driving circuit; a square edge-hole component 31 is arranged on the adjustable resistor; the square edge-hole component 31 matched with and corresponding to a rotating shaft 52 is arranged on the adjustable resistor; and the rotating shaft 52 passes through the control board fixing seat 4 and is inserted into the edge-hole component 31.

The present disclosure uses a lamp body rotation structure. The lamp holder 1, the lower lamp cup cover 2, the control board 3, the control board fixing seat 4, upper lamp cup cover 5, the lamp panel 6, and the lampshade 7 are arranged in sequence. By cooperation with a lamp body assembly, the lower lamp cup cover and the upper lamp cup cover are rotated to drive the adjustable resistor on the circuit board. Continuous selection of gears can be achieved through the circular arc groove, thereby achieving dimming. The dimming is not limited to brightness adjustment. Various lighting states can be adjusted, such as color temperature adjustment, color adjustment, and lighting mode adjustment. The rotating bulb is easy to remove and mount.

The lamp holder 1 is lamp holder E26. E26 is the model number. E26 is a lamp holder of a standard bulb lamp in the United States, which is rotated to a lamp base for electricity taking. The lamp holder 1 is a standard lamp holder E26, which is riveted on the lower lamp cup cover 2 using a tool and equipment. After mounting, the lamp holder is tight, and it is hard for people to remove it. This ensures good contact and safety of electrification.

The adjustable resistor is provided with a square edge-hole component 31 in the middle. The rotating shaft 52 is inserted into the edge-hole component 31. When the rotating shaft 52 rotates, the adjustable resistor rotates along with it, thus generating different resistance voltage signals. The upper lamp cup cover 5 is provided with the circular arc groove 51. The through holes are respectively provided at the two ends of the circular arc groove 51. The curvature of the circular arc groove 51 is 120 degrees, so that the circular arc groove 51 is restricted by the convex column 41. Therefore, when the entire upper lamp cup cover 5 rotates, the upper lamp cup cover can only rotate between 0 degree and 120 degrees. During the rotation, the convex column 41 will press against the two ends at 0 degree and 120 degrees, namely, the through holes in the two ends of the circular arc groove 51. A user can rotate the upper cover 5 with a hand, and the rotation of the upper cover 5 will drive the rotating shaft 52 to rotate. As they are one-piece, the rotation of the rotating shaft 52 will drive the adjustable resistor to rotate, thus generating different resistance voltage signals. The control board 3 can identify the different voltages generated by the adjustable resistor. The control board 3 is electrically connected to the lamp panel 6, and the lamp panel 6 is provided with light beads, to control the bulb to achieve stepless dimming, brightness adjustment, color temperature adjustment, or color adjustment.

Preferably, as shown in FIG. 1, to prevent the control board fixing seat 4 from falling off from the upper lamp cup cover 5 and to enable the control board fixing seat and the upper lamp cup cover to be rotatably connected, the upper lamp cup cover 5 is uniformly provided with a plurality of buckles 53 centered on the rotating shaft 52; the buckles 53 are provided with protruding portions facing away from the rotating shaft 52; the protruding portions are provided with circular-arc-shaped upper surfaces; the control board fixing seat 4 is provided with a hollow cylinder 42; and the buckles 53 are in buckled connection with the hollow cylinder 42. After the buckles 53 are clamped into the hollow cylinder through the circular-arc-shaped upper surfaces, the protruding portions are arranged above a wall of the hollow cylinder. The buckles 53 can prevent the control board fixing seat 4 from falling off from the upper lamp cup cover 5. Since the protruding portions are provided with the circular-arc-shaped upper surfaces, it facilitates the buckles 53 to cooperate with the hollow cylinder 42. The protruding portions can prevent the control board fixing seat 4 from falling off from the upper lamp cup cover 5. A user can rotate the control board fixing seat 4 to make the control board fixing seat 4 rotate relative to the upper lamp cup cover 5 or make the lower lamp cup cover 2 and the upper lamp cup cover 5 rotate relative to each other. It is easy for removal and mounting by the buckling between the buckles 53 and the hollow cylinder 42.

The power management circuit, the ADC chip, the adjustable resistor, the bulb driving circuit, and the control chip on the control board 3 are all existing functional components.

A user can rotate the lower lamp cup cover 2, so that the control board 3 mounted in the lower lamp cup cover 2 passes through the edge-hole component 31. The rotating shaft 52 extends into the edge-hole component 31 to drive the adjustable resistor to rotate. The lower lamp cup cover 2 and the upper lamp cup cover 5 are rotatably connected.

Preferably, three buckles 53 are included.

Figure 2:
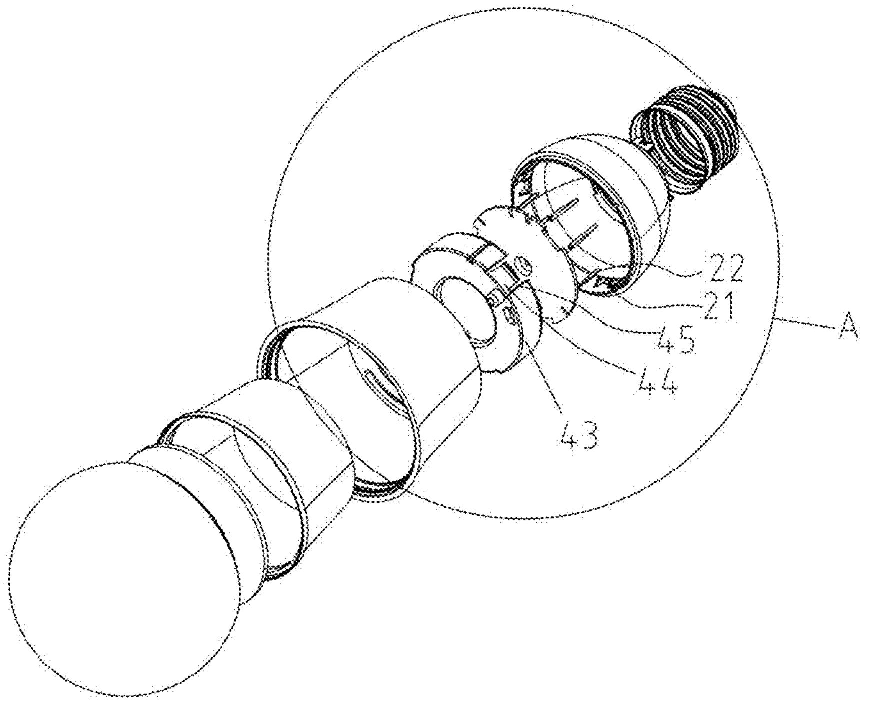
FIG. 2 is another exploded view of the present disclosure.

Preferably, as shown in FIG. 2, to fixedly connect the control board fixing seat 4 into the lower lamp cup cover 2, the control board fixing seat 4 is provided with a round wall 43 facing the lower lamp cup cover 2; a plurality of clamping blocks 44 are uniformly arranged on the round wall 43 in a spacing manner; protrusions 21 matched with and corresponding to the clamping blocks 44 are arranged in the lower lamp cup cover 2; limiting notches 45 are arranged on two sides of the clamping blocks 44; and limiting strips 22 matched with and corresponding to the limiting notches 45 are arranged in the lower lamp cup cover 2. The clamping blocks 44 are connected to the protrusions 21, and the control board fixing seat 4 can connected to the lower lamp cup cover 2. The control board fixing seat 4 is connected to the lower lamp cup cover 2, so that movements of the control board fixing seat 4 and the lower lamp cup cover 2 are limited, to prevent the control board fixing seat 4 from falling off from the lower lamp cup cover 2. The limiting notches 45 can cause the clamping blocks 44 to undergo elastic deformation, facilitating the buckled connection of the clamping blocks 44.

Figure 6:
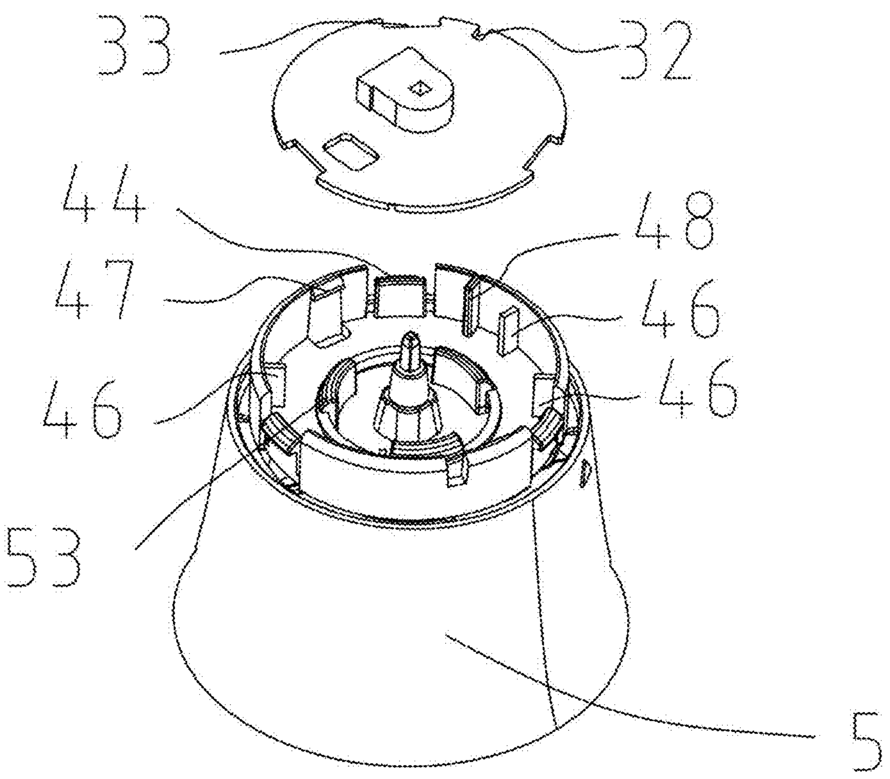
FIG. 6 is a schematic diagram of mounting of a control board fixing seat and an upper lamp cup cover according to the present disclosure.
Figure 7:
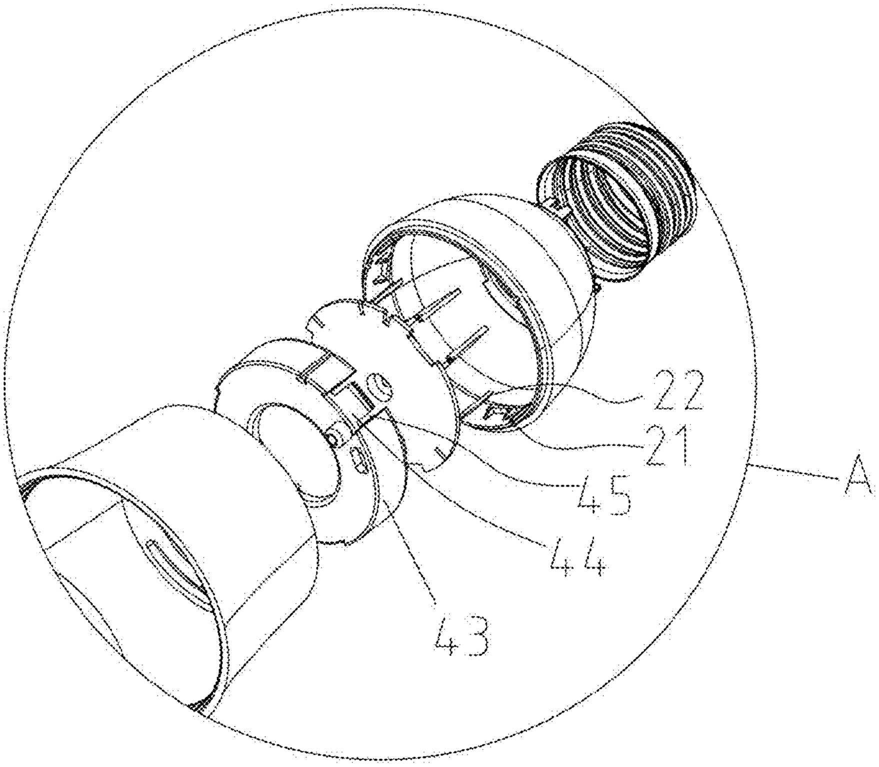
FIG. 7 is an enlarged view of part A in FIG. 2.

Preferably, as shown in FIG. 6, to fixedly mount the control board 3 in the control board fixing seat 4, a plurality of supporting plates 46 are uniformly arranged in the round wall 43 in a spacing manner; a limiting plate 47 is arranged in the round wall 43; the control board 3 is located between the supporting plates 46 and the limiting plate 47; a positioning strip 48 is arranged in the round wall 43; and a positioning notch 32 corresponding to the positioning strip 48 is provided on the control board 3. The supporting plates 46 are higher than the buckles 53. The control board 3 is located between the supporting plates 46 and the limiting plate 47, which can prevent the control board 3 from falling off from the control board fixing seat 4. The positioning strip 48 is matched with and corresponds to the positioning notch 32, which can prevent the control board 3 from rotating and fix the control board 3.

Preferably, the control board 3 is provided with accommodating notches 33 corresponding to positions and the quantity of the clamping blocks 44. When the clamping blocks 44 are buckled with the protrusions 21 in the lower lamp cup cover 2, the clamping blocks will deform towards one side of the control board 3. The accommodating notches 33 can accommodate the clamping blocks 44 to prevent the clamping blocks 44 from scratching or squeezing the control board 3.

Figure 5:
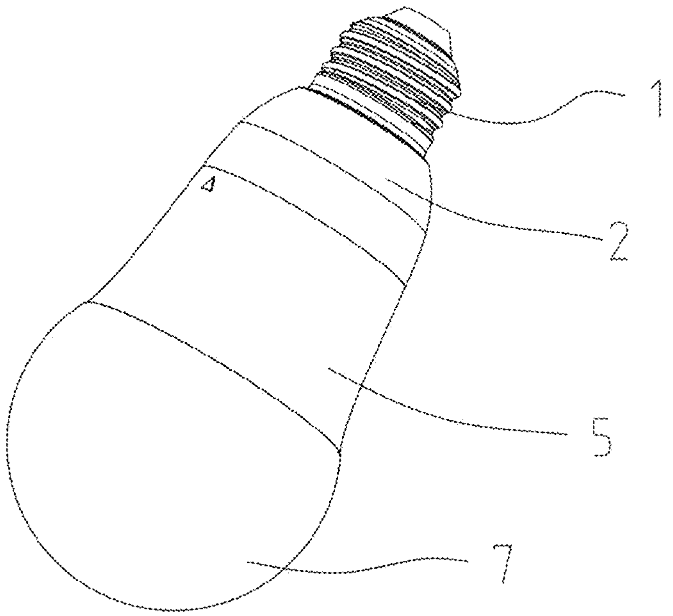
FIG. 5 is a three-dimensional diagram of the present disclosure.

Preferably, as shown in FIG. 5, the lower lamp cup cover 2 is provided with scales, and the upper lamp cup cover 5 is provided with an arrow indicator which can be configured to indicate rotation gears. The lower lamp cup cover 2 is provided with scales max and min, respectively indicating the maximum gear and the minimum gear. Correspondingly, the through holes are respectively provided at the two ends of the circular arc groove 51. The two through holes respectively correspond to gear max and gear min. By the two through holes, whether the convex column 41 has been mounted in the circular arc groove 51 can be seen during assembling.

Preferably, as shown in the figures, an external thread is provided on the lampshade 7; an internal thread matched with and corresponding to the external thread is provided in the upper lamp cup cover 5; and the lampshade 7 is in threaded connection with the upper lamp cup cover 5. The lampshade 7 is made of a transparent material, and the lamp panel 6 is provided with light beads.

Preferably, as shown in FIG. 1, a mounting sleeve 8 is further arranged in the upper lamp cup cover 5; the lamp panel 6 is mounted and connected to the mounting sleeve 8; and the lamp panel 6 is arranged between the mounting sleeve 8 and the lampshade 7. The lampshade 7 is in threaded connection with the upper lamp cup cover 5, thereby fixing the lamp panel 6. The lamp panel 6 is electrically connected to the control board 3. The mounting sleeve 8 is a thin aluminum cup to achieve heat dissipation on the lamp panel 6. The upper lamp cup cover 5 is provided outside the aluminum cup in a secondary injection molding manner to achieve an insulation effect. The upper lamp cup cover 5 is made of plastic, and the mounting sleeve 8 which is the aluminum cup is embedded inside for heat dissipation.

Figure 3:
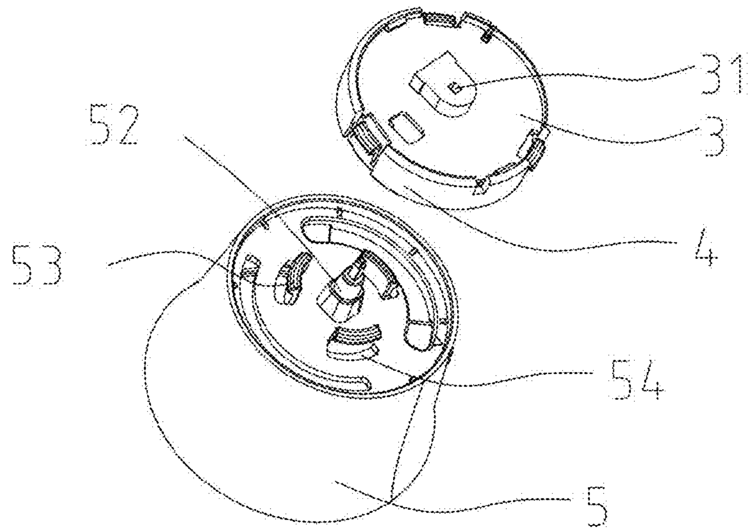
FIG. 3 is a schematic diagram of mounting of a control board, a control board fixing seat, and an upper lamp cup cover according to the present disclosure.
Figure 4:
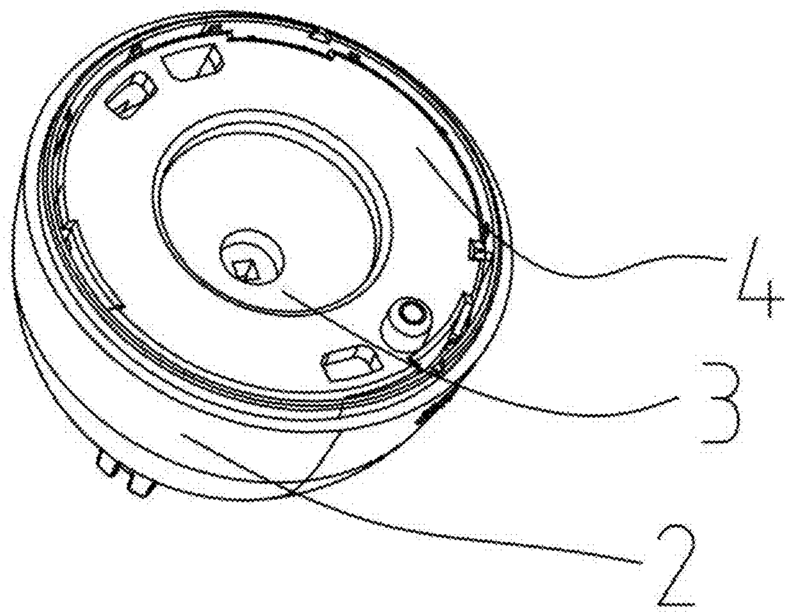
FIG. 4 is a schematic diagram of a planar front view of a top surface of a main shell according to the present disclosure.

Preferably, as shown in FIG. 3, penetration holes 54 facing away from the rotating shaft 52 are provided below the buckles 53. The penetration holes 54 can enable the buckles 53 to undergo elastic deformation easily, which facilitates the buckled connection with the buckles 53.

The adjustable resistor may be a potentiometer. The ADC chip may be an existing analog-to-digital converter, the function of which is to converte resistance changes of the adjustable resistor into different voltage signals. The control chip is a microcontroller, which receives the voltage signals from the ADC and generates, according to these signals, an instruction for controlling the bulb. The chip adjusts the brightness, color temperature, or color of the bulb by controlling pulse width modulation (PWM) signals or other dimming technologies. The bulb driving circuit adjusts the output power of the bulb according to the instructions of the control chip, and controls the brightness and color of the bulb. The power management circuit provides stable voltage and current to the circuit board and bulb, ensuring normal operation of the entire system. The control board 3 can achieve stepless dimming. Since the lamp body can freely rotate within 0 degree to 120 degrees, the lighting adjustment is stepless, which can achieve a smooth and continuous dimming effect. However, dimming is not limited to brightness adjustment. Various lighting states can be adjusted, such as color temperature adjustment, color adjustment, and lighting mode adjustment.

The control board 3 can provide feedback control, and the entire system can achieve different lighting effects in different angles. Clockwise rotation increases the brightness or color temperature, and counterclockwise rotation decreases the brightness or color temperature, thereby achieving precise lighting control. By the use of the lamp body rotation structure, due to the cooperation with the lamp body assembly, the upper and lower parts of the lamp body are rotated to achieve dimming, which can adjust brightness, wattage, color temperature, and light color. Due to the structural innovation, the rotation of the upper and lower parts of the lamp body drives the adjustable resistor on the circuit board. A chip (a micro control unit (MCU) with ADC detection) on a printed circuit board (PCB) can identify the different voltages generated by the adjustable resistor, thereby controlling the bulb to perform stepless dimming, including brightness adjustment, color temperature adjustment, color adjustment, and the like. Due to a free rotation position of the upper lamp cup cover 5, the stepless dimming can be achieved. The rotation of the lamp body is fixed within a rotation space of 0 degree to 120 degrees. Within this range, different lighting effects can be achieved at various angles. The light is brightened by clockwise rotation and is darkened by counterclockwise rotation.

Although the embodiments of the present disclosure have been shown and described, it can be understood by those of ordinary skill in the art that various changes, modifications, substitutions, and variations can be made to these embodiments without departing from the principle and spirit of the present disclosure. The scope of the present disclosure is defined by the accompanying claims and their equivalents.

What is claimed is:

1. A rotating bulb, comprising: a lamp holder (1), a lower lamp cup cover (2), a control board (3), a control board fixing seat (4), an upper lamp cup cover (5), a lamp panel (6), and a lampshade (7), wherein the lamp holder (1) is connected above the lower lamp cup cover (2); the control board (3) is mounted on the control board fixing seat (4); the control board (3) and the control board fixing seat (4) are accommodated in a lower part of the lower lamp cup cover (2); the control board fixing seat (4) is connected to the lower lamp cup cover (2); the control board fixing seat (4) is rotatably connected to the upper lamp cup cover (5); the lower lamp cup cover (2) is arranged above the upper lamp cup cover (5); the upper lamp cup cover (5) is detachably connected to the lampshade (7); the lamp panel (6) is mounted inside a lower part of the upper lamp cup cover (5); the upper lamp cup cover (5) is provided with a circular arc groove (51); through holes are respectively provided at two ends of the circular arc groove (51); the upper lamp cup cover (5) is provided with a circular arc through hole; a convex column (41) corresponding to the circular arc groove (51) is arranged at a bottom of the control board fixing seat (4); the control board fixing seat (4) is hollow; the upper lamp cup cover (5) is provided with a rotating shaft (52); the control board (3) is provided with a power management circuit, an analog-to-digital conversion (ADC) chip, an adjustable resistor, a bulb driving circuit, and a control chip; the adjustable resistor and the control chip are connected to the ADC chip; the control chip is connected to the bulb driving circuit; a square edge-hole component (31) is arranged on the adjustable resistor; and the rotating shaft (52) passes through the control board fixing seat (4) and is inserted into the edge-hole component (31).

2. The rotating bulb according to claim 1, wherein the upper lamp cup cover (5) is uniformly provided with a plurality of buckles (53) centered on the rotating shaft (52); the buckles (53) are provided with protruding portions facing away from the rotating shaft (52); the protruding portions are provided with circular-arc-shaped upper surfaces; the control board fixing seat (4) is provided with a hollow cylinder (42); and the buckles (53) are in buckled connection with the hollow cylinder (42).

3. The rotating bulb according to claim 2, wherein the control board fixing seat (4) is provided with a round wall (43) facing the lower lamp cup cover (2); a plurality of clamping blocks (44) are uniformly arranged on the round wall (43) in a spacing manner; protrusions (21) matched with and corresponding to the clamping blocks (44) are arranged in the lower lamp cup cover (2); limiting notches (45) are arranged on two sides of the clamping blocks (44); and limiting strips (22) matched with and corresponding to the limiting notches (45) are arranged in the lower lamp cup cover (2).

4. The rotating bulb according to claim 2, wherein three buckles (53) are comprised.

5. The rotating bulb according to claim 1, wherein the control board fixing seat (4) is provided with a round wall (43) facing the lower lamp cup cover (2); a plurality of clamping blocks (44) are uniformly arranged on the round wall (43) in a spacing manner; protrusions (21) matched with and corresponding to the clamping blocks (44) are arranged in the lower lamp cup cover (2); limiting notches (45) are arranged on two sides of the clamping blocks (44); and limiting strips (22) matched with and corresponding to the limiting notches (45) are arranged in the lower lamp cup cover (2).

6. The rotating bulb according to claim 5, wherein an external thread is provided on the lampshade (7); an internal thread matched with and corresponding to the external thread is provided in the upper lamp cup cover (5); and the lampshade (7) is in threaded connection with the upper lamp cup cover (5).

7. The rotating bulb according to claim 6, wherein a mounting sleeve (8) is further arranged in the upper lamp cup cover (5); the lamp panel (6) is mounted and connected to the mounting sleeve (8); and the lamp panel (6) is arranged between the mounting sleeve (8) and the lampshade (7).

8. The rotating bulb according to claim 5, wherein a plurality of supporting plates (46) are uniformly arranged in the round wall (43) in a spacing manner; a limiting plate (47) is arranged in the round wall (43); the control board (3) is located between the supporting plates (46) and the limiting plate (47); a positioning strip (48) is arranged in the round wall (43); and a positioning notch (32) corresponding to the positioning strip (48) is provided on the control board (3).

9. The rotating bulb according to claim 5, wherein the control board (3) is provided with accommodating notches (33) corresponding to positions and the quantity of the clamping blocks (44).

10. The rotating bulb according to claim 5, wherein penetration holes (54) facing away from the rotating shaft (52) are provided below the buckles (53).

11. The rotating bulb according to claim 5, wherein scales are provided on the lower lamp cup cover (2); and an arrow indicator is provided on the upper lamp cup cover (5).

* * * * *